(12) United States Patent
Lombardi

(10) Patent No.: US 8,057,697 B2
(45) Date of Patent: Nov. 15, 2011

(54) LAPPING COMPOSITION AND METHOD USING SAME

(76) Inventor: John L. Lombardi, Tucson, AZ (US)

( * ) Notice: Subject to any disclaimer, the term of this patent is extended or adjusted under 35 U.S.C. 154(b) by 184 days.

(21) Appl. No.: 12/615,248

(22) Filed: Nov. 9, 2009

(65) Prior Publication Data

US 2010/0117024 A1 May 13, 2010

Related U.S. Application Data

(63) Continuation-in-part of application No. 11/426,281, filed on Jun. 23, 2006, now abandoned.

(51) Int. Cl.
*C09K 13/00* (2006.01)
*C09K 13/02* (2006.01)

(52) U.S. Cl. ...................... 252/79.1; 252/79.5

(58) Field of Classification Search ............. 252/79.1, 252/79.5
See application file for complete search history.

(56) References Cited

U.S. PATENT DOCUMENTS

| | | | |
|---|---|---|---|
| 3,956,402 | A | 5/1976 | Schellenbaum |
| 4,476,219 | A | 10/1984 | Sakanoue et al. |
| 6,468,137 | B1 | 10/2002 | Fang et al. |
| 2003/0064671 | A1 | 4/2003 | Pasqualoni et al. |
| 2003/0194953 | A1 | 10/2003 | McClain et al. |
| 2004/0157535 | A1 | 8/2004 | Chaneyalew et al. |
| 2004/0159050 | A1 | 8/2004 | Pasqualoni et al. |

OTHER PUBLICATIONS

International Search Report and Written Opinion dated Apr. 12, 2009.

*Primary Examiner* — Roberts Culbert
(74) *Attorney, Agent, or Firm* — Dale F. Regelman; Bryan D. Treglia; Quarles & Brady LLP

(57) ABSTRACT

A lapping composition is presented, wherein that lapping composition is formed by mixing a solvent, a base, and a phenolic compound having structure I:

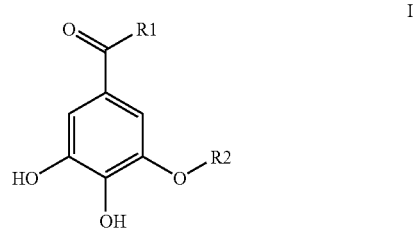

wherein R1 is selected from the group consisting of $-O^-M^{x+}$ wherein x is selected from the group consisting of 1, 2, and 3, $-O-R3$ wherein R3 is selected from the group consisting of alkyl, allyl, and phenyl, $-N(R3R4)$ wherein R4 is selected from the group consisting of $-H$, alkyl, allyl, and phenyl, and $-S-R3$; and wherein R2 is selected from the group consisting of $-O^-M^{x+}$ wherein x is selected from the group consisting of 1, 2, and 3, $-O-R3$ wherein R3 is selected from the group consisting of alkyl, allyl, and phenyl, $-N(R3R4)$ wherein R4 is selected from the group consisting of $-H$, alkyl, allyl, and phenyl, and $-S-R3$.

19 Claims, No Drawings

LAPPING COMPOSITION AND METHOD USING SAME

CROSS REFERENCE TO RELATED APPLICATIONS

This Application is a Continuation-In-Part and claims priority from a U.S. application having Ser. No. 11/426,281 filed Jun. 23, 2006.

FIELD OF THE INVENTION

The invention relates to a composition useful in grinding, cutting, and/or polishing the surface of ceramic and/or metallic objects.

BACKGROUND OF THE INVENTION

Lapping, grinding, cutting, and polishing, collectively referred to herein as "lapping," are key manufacturing technologies for shaping various ceramic and metallic materials. Lapping provides a mechanism to shape the surface of a substrate.

Lapping is often performed using a versatile, high-precision polishing machine using a scrolled cast iron plate. The machine generally includes a reciprocating roller bar mechanism to hold the sample in position while allowing for constant plate conditioning during the preparation process. In some applications, the lapping comprises a medium grit (10 to 15 micron) silicon carbide powder, suspended in a lapping composition. Other abrasive materials include medium grit aluminum oxide, boron carbide, and the like. By "lapping composition," Applicant means a fluid used during a process to shape the surface of a substrate, where that process includes contacting a target surface of the substrate with one or more abrasives while also contacting that target surface with the lapping composition.

The choice of abrasive depends on the type of material—a very aggressive abrasive, such as diamond will cause a deeper damage layer at the surface. Damage penetration can be reduced by decreasing the load on the sample and the plate speed as the final thickness is approached.

After lapping, the sample can be polished using chemo-mechanical suspensions of, for example, colloidal silica (0.125 micron) or aluminum oxide (0.3 micron). The slurry suspensions comprising one or more abrasives suspended in Applicant's lapping composition are pumped continuously over the plate.

SUMMARY OF THE INVENTION

A lapping composition is presented, wherein that lapping composition is formed by mixing a solvent, a base, and a phenolic compound having structure I:

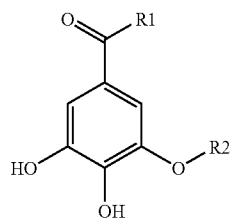

wherein R1 is selected from the group consisting of —O⁻M$^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3; and wherein R2 is selected from the group consisting of —O⁻M$^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3.

A lapping composition is presented, wherein that lapping composition comprises a compound having structure I or salts thereof:

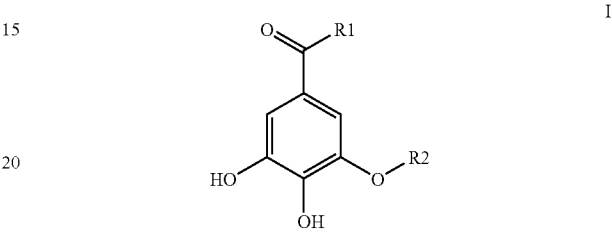

wherein R1 is selected from the group consisting of —O⁻M$^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3, and wherein R2 is selected from the group consisting of —O⁻M$^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As a general matter, the lapping process using Applicant's lapping composition comprises the steps of providing a substrate, where that substrate comprises a target surface, where that target surface may comprise a metal surface, a ceramic surface, a polymeric material, such as for example polycarbonate, or combinations thereof; and the like; providing one or more abrasives; providing Applicant's lapping composition; mounting the substrate in a lapping machine comprising a moveable lapping/polishing surface, wherein in certain embodiments the one or more abrasives may be disposed on the lapping/polishing surface; contacting the target surface with Applicant's lapping composition, where in certain embodiments the one or more abrasives may be disposed in Applicant's lapping composition; and moving the lapping/polishing surface against the target surface.

A number of factors influence the quality of surfaces shaped by these methods including the size and composition of the particular abrasive grit employed as well as the amount of pressure applied to the surface. Fluids are often also cascaded upon the part during these operations. Among other functions, such fluids remove heat during machining. In addition, such fluids lubricate the abrasive/surface contact area. Such fluids also remove swarf from the part. As those skilled in the art will appreciate, swarf comprises metallic/ceramic filings or shavings removed by a cutting tool.

Rapid swarf removal is desirable in order to efficiently shape the part as well as reproducibly produce smooth, high quality surfaces. Hence it is desirable that the machining fluid exhibits a significant affinity for the surface of the material being shaped. In certain embodiments, such an affinity includes chemisorption upon the ceramic or metallic material; such that its swarf is wetted, dispersed within, and ultimately washed away by the cascading machining fluid.

The invention will be described herein as embodied in a lapping composition useful in the manufacture of read/write heads for computer hard disks. The following description of Applicant's composition, and uses thereof, is not meant, however, to limit Applicant's invention to the manufacture of such hard disks, or to the manufacture of data storage devices in general, as the invention herein can be applied to surface preparation of metals, ceramics, and the like. In addition, Applicant's compositions are useful in a myriad of applications, including without limitation polishing and/or chemical mechanical polishing of various substrates, manufacture of semiconductor devices, and the like.

As one example, the manufacture of read/write heads for computer hard disks, and the manufacture of the hard disks, includes one or more lapping processes. As those skilled in the art will appreciate, such computer hard disks comprise rotatable disks comprising one or more magnetic materials. Information is written to, and read from, such magnetic disks using a read/write head.

As those skilled in the art will appreciate, computer hard disks are rotatably disposed in a disk drive unit such that the magnetic disk rotates rapidly as information is written thereto and/or read therefrom. In order to prevent the read/write head from damaging the disk surface when that disk is rapidly rotating, it is critical that the read/write head be planarized so that it exhibits minimal surface roughness.

There is an on-going need to maximize the storage density in such computer hard disks. In order to increase that storage density, the fly height between the rotating disk and the read write head is continually decreasing. As a result, increased demands are being placed upon surface quality of both the read-write head and the hard disk.

One such read/write head is often referred to as a Giant Magnetoresistive (GMR) Head. Such GMR Heads comprise a metallized ceramic material. GMR Heads typically comprise TiC-Alumina ceramic, sometimes called "AlTiC," that has been metallized with a variety of ferrous and non-ferrous alloy layers. Prior art GMR Head lapping methods utilize fluids comprising a diamond abrasive dispersed in a mixture of water, various alcohols, and other additives. In order to prevent corrosion of its GMR Head metal layers which would adversely effect the Head's electromagnetic properties and operational performance within the computer hard drive.

These prior art GMR Head lapping methods are inefficient, exhibiting low AlTiC and metallized layer material removal rates (MRR). A low MRR is undesirable from a manufacturing standpoint because the MRR often comprises a rate-limiting step in the production of read/write heads.

In certain embodiments, Applicant's lapping composition comprises one or more substituted gallate moieties, one or more substituted gallamide moieties, and/or one or more substituted gallic acid moieties. In certain embodiments, Applicant's lapping composition further comprises one or more hydrocarbons, petroleum distillates, mineral oils, vegetable oils, esters, alcohols, amines, propylene glycol, ethylene glycol, one or more dipolar aprotic solvents, water, and mixtures thereof. In certain embodiments, Applicant's lapping composition includes one or more amine and/or alkali neutralized salts of gallic acid.

In certain embodiments, Applicant's lapping composition comprises a mixture of a lipophilic alcohol and mineral oil. In certain embodiments, the lipophilic alcohol comprises a Guerbet alcohol. In certain embodiments, Applicant's non-aqueous lapping composition comprises a gallate Guerbet ester, formed for example and without limitation, by reacting gallic acid with a Guerbet alcohol.

Guerbet alcohols are the oldest and best-understood material in the class of compounds, first synthesized by Marcel Guerbet. The reaction sequence, which bears his name, is related to the Aldol Reaction and occurs at high temperatures under catalytic conditions. The product is an alcohol with twice the molecular weight of the starting alcohol minus a mole of water.

In certain embodiments, Applicant's non-aqueous lapping composition comprises 2-butyl-1-octanol and/or 2-hexyl-1-decanol. Alcohols 2-butyl-1-octanol and 2-hexyl-1-decanol were diluted with various amounts of mineral oil. The mass ratios of these solutions varied from 1:2 to 1:10 alcohol to mineral oil. These components were miscible without heating.

In certain embodiments, Applicant's lapping composition comprises hydroxyl substituted benzoic acids. In certain embodiments, Applicant's lapping composition comprises one or more derivatives of gallic acid, compound I.

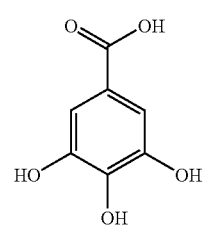

I

In certain of these embodiments, gallic acid-derived materials are dispersed in an aqueous or non-aqueous fluid. Due to the highly acidic nature of gallic acid, Applicant neutralizes the one or more gallic derivatives disposed in Applicant's lapping composition using a variety of amines, alkali hydroxides, choline derivatives, guanidine derivatives, TMAH, prior to use in lapping formulations. Suitable bases include but are not limited to alkanolamines, alkylamines, choline, guanidine derivatives, and the like. Alkaline lapping compositions are desirable to minimize corrosion which may occur during lapping of metallic surfaces. The reaction stoichiometry required to neutralize Applicant's gallic acid embodiments is a function of the pKa of the particular base used.

As a general matter, at least one equivalent of base is used for each equivalent of carboxylic acid available in the one or more substituted gallic acid compounds disposed in the lapping composition. As a further general matter, Applicant has found it desirable to have lapping fluid compositions comprising a pH greater than or equal to 10. As those skilled in the art will appreciate, such a resultant pH may require a two or more molar excess of base with respect to the substituted gallic acid compounds used.

It is known in the chemical arts that gallic acid dimerizes to form Ellagic acid derivatives, Compound III, where R10, R11, R12, and R13, are selected from the group consisting of ammonium salts, alkali metal ions, alkaline earth ions, guanidinium ions, choline cations, and the like.

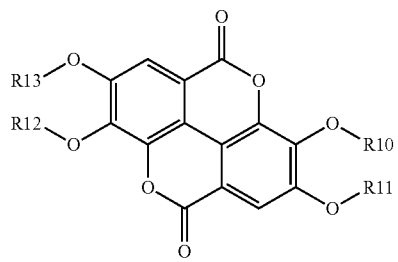

III

In order to eliminate this dimerization of gallic acid-derived compounds, and to generally improve the oxidative stability of Applicant's lapping composition, Applicant synthesized a variety of substituted gallic-acid moieties II. Applicant discovered that blocking one of the three phenolic hydroxyl groups markedly improved the oxidative stability of the lapping composition while maintaining a high MRR rate.

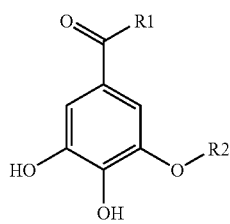

II

Compound IV, a salt of compound II wherein R1 is O—CH$_3$, can effectively complex with metal cations to promote swarf removal.

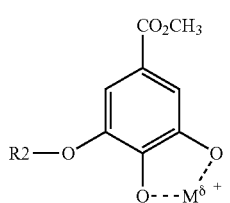

IV

A functionalized gallate derivative II can be prepared using a three step synthetic scheme, wherein two phenol hydroxyl groups are first protected, the remaining phenolic hydroxyl group is alkylated, and then the protective group is removed to generate compound II. A generalized sequence of reactions is shown below using compound II wherein R1 is —O—CH$_3$ and wherein R2 is —CH$_2$—CO—O—CH$_3$.

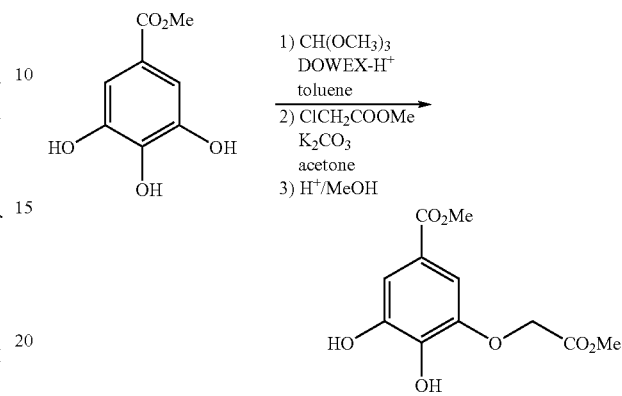

The following examples are presented to further illustrate to persons skilled in the art how to make and use the invention. These examples are not intended as a limitation, however, upon the scope of the invention.

Example 1

Methyl gallate V was esterified in a 1:1 molar stoichiometry with tetramethylorthoformate (TMOF) to form an orthformate protected gallate VI within toluene solvent containing a catalytic amount of Amberlyst polystyrene sulfonic acid catalyst. A toluene-methanol binary azeotrope mixture was then distilled off using a Dean Stark tube. The low boiling point of the toluene-methanol azeotrope enabled the transesterification reaction to be efficiently conducted at low temperatures (ca. 64° C.) which prevented degradation of heat sensitive methyl gallate starting material as well as formation of undesirable side reaction product impurities.

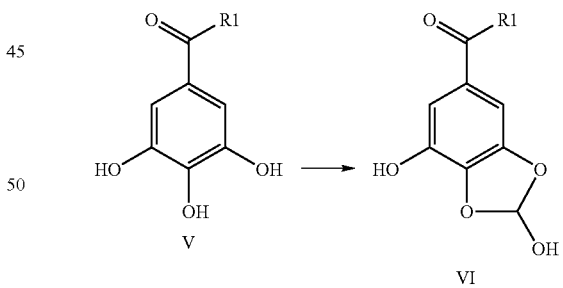

In other embodiments, R1 is selected from the group comprising —N(R3)(R4), and —S—R3, wherein R3 and R4 are independently selected from the group comprising alkyl, allyl, and phenyl.

Example 2

The orthoformate protected gallate VI was then O-alkylated and converted to compound VII after a two hour reaction in refluxing acetone solvent containing ethyl bromoacetate and anhydrous potassium carbonate (K$_2$CO$_3$). Potassium carbonate was added to neutralize the HBr acid generated, converting it to insoluble potassium bromide (KBr) solid by-product which formed during the gallate O-alkylation reaction.

After refluxing, KBr and residual $K_2CO_3$ solids were filtered from the acetone solution, the acetone solvent was then stripped off using a rotary evaporator and a rose colored solid product VII was collected.

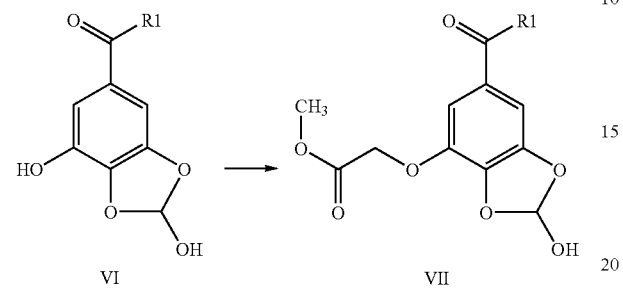

In other embodiments, ethylcholoracetate was used to form product VII. In still other embodiments, the O-alkylation was effected using $Cl-CH_2-CO-N(R3)(R4)$. In yet other embodiments, the O-alkylation was effected using $Cl-CH_2-CO-S-R3$.

Example 3

The solid product VII was then dissolved in a dilute solution of sulfuric acid in methanol which was allowed to stand at room temperature for approximately an hour. This removed the orthoformate protection group and yielded alkylated product VIII.

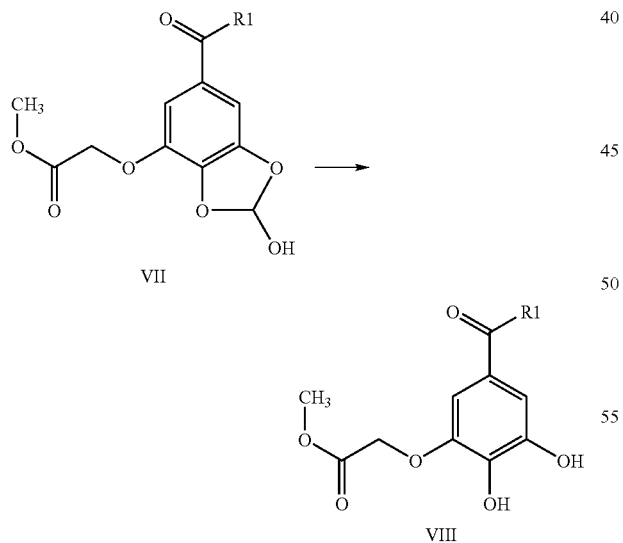

Example 4

Finally, compound VIII was then hydrolyzed within a dilute acid/methanol solvent to give compound IX.

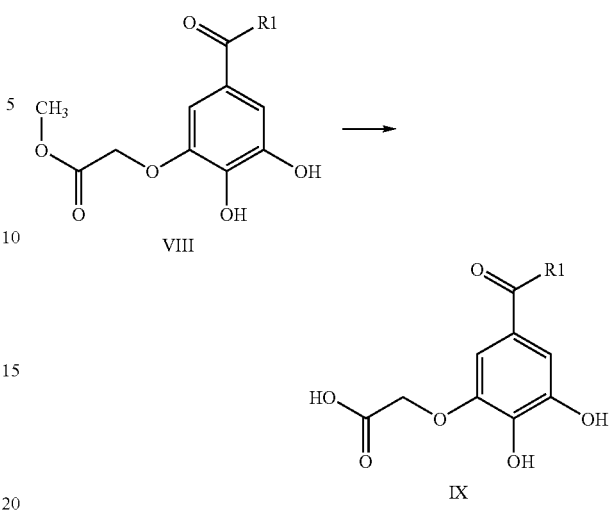

Applicant treated protected diester VIII with excess dodecyl amine to test the reactivity of the two esters. At elevated temperature in methanol, only the aliphatic amido diol X was observed. Applicant determined that alkyl amide had formed by observing that the $^1H$ NMR chemical shift of the methylene group between the methyl ester and aromatic oxygen ($Ar-O-CH_2-CO_2Me$) of VIII was 4.8 ppm, while the chemical shift of the methylene group of X ($Ar-O-CH_2-CONHC_{12}H_{25}$) was 4.4 ppm.

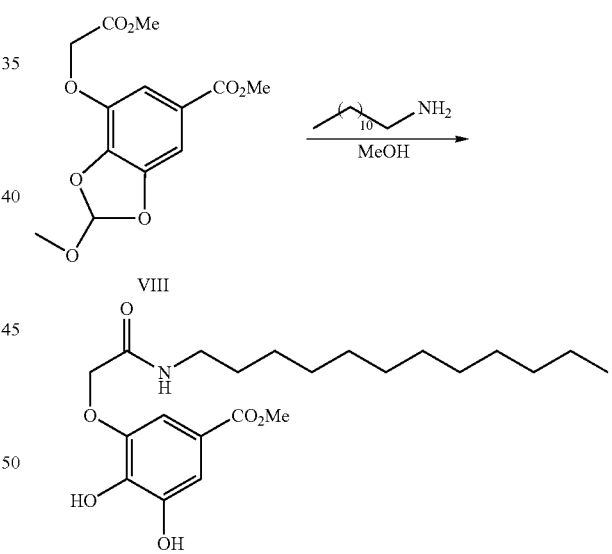

Example 5

A more lipophilic corrosion inhibitor was prepared using lauryl(dodecyl)gallate XI. Using the same sequence of chemistry described hereinabove, protection of lauryl gallate with trimethyl orthoformate provided ester XII in nearly quantitative yield. The protection of lauryl gallate was easier to achieve—likely because of its greater solubility in toluene. Alkylation of XII with α-chloro methyl acetate in the presence of potassium carbonate in acetone gave diester XIII in 86% yield. Removal of the protecting group with DOWEX provided diester diol XIV in nearly quantitative yields.

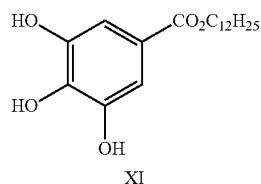

XI

TMOF
DOWEX-H⁺
toluene

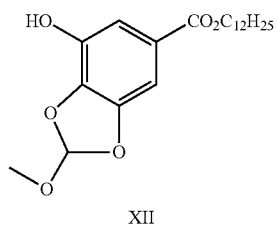

XII

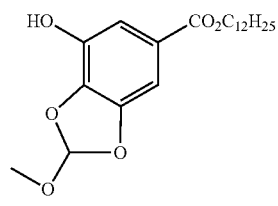

XII

Cl⎯⎯CO₂Me
K₂CO₃
acetone

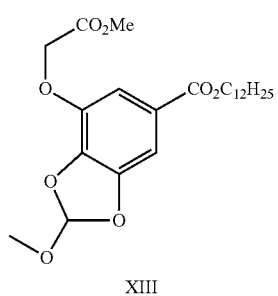

XIII

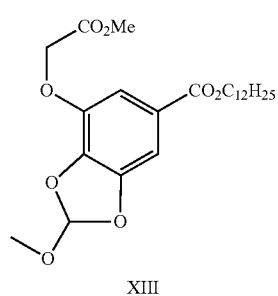

XIII

DOWEX-H⁺
MeOH

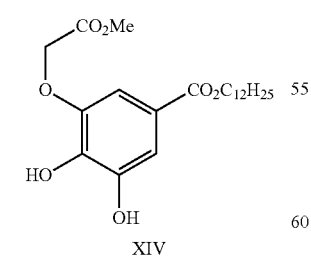

XIV

Using diester XIII as an advanced intermediate, Applicant has prepared analogues with various degrees of lipophilicity. For example, amidation of XIII with lauryl (dodecyl) amine in refluxing methanol provided diphenol ester XV.

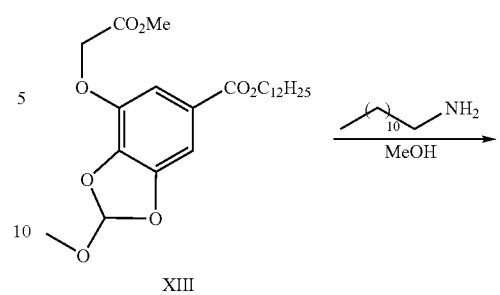

XIII

CH₃(CH₂)₁₀CH₂NH₂
―――――――――→
MeOH

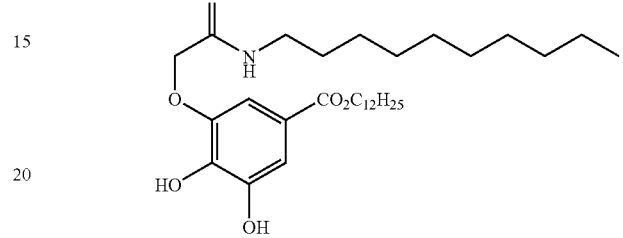

XV

Example 7

Using the synthetic reaction schemes described hereinabove, Applicant has prepared a variety of meta substituted oxy ester gallates XVI. Applicant has found that lapping compositions comprising such meta substituted oxy ester gallates XVI can be formulated using either one or more aqueous fluids, or one or more non-aqueous fluids, wherein the concentration of the one or more meta substituted oxy ester gallates XVI is between about 0.5 weight percent to about 30 weight percent.

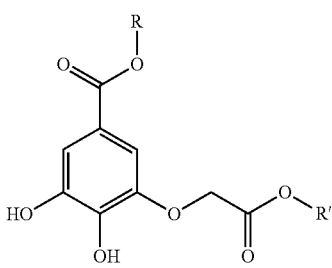

XVI

R = H, alkyl, allyl, phenyl
R' = H, alkyl, allyl, phenyl

Example 8

Using the synthetic reaction schemes described hereinabove, Applicant has prepared a variety of meta substituted oxy ester gallate salts XVII. Applicant has found that lapping compositions comprising such meta substituted oxy ester gallate salts XVII can be formulated using either one or more aqueous fluids, or one or more non-aqueous fluids, wherein the concentration of the one or more meta substituted oxy ester gallate salts XVII is between about 0.5 weight percent to about 30 weight percent.

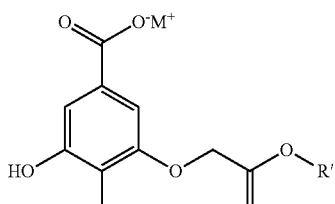

XVII

R = H, alkyl, allyl, phenyl
M = Li, Na, K, Cs

Example 9

Using the synthetic reaction schemes described hereinabove, Applicant has prepared a variety of meta substituted oxy carboxylate gallate salts XVIII. In certain embodiments, the metal cation complement to the carboxylate anion comprises a monovalent alkali cation. In certain embodiments, the metal cation complement to the carboxylate anion comprises a divalent alkaline earth cation. In certain embodiments, the metal cation complement to the carboxylate anion comprises a trivalent cation such as $Al^{+++}$. Applicant has found that lapping compositions comprising such meta substituted oxy carboxylate gallate salts XVIII can be formulated using either one or more aqueous fluids, or one or more non-aqueous fluids, wherein the concentration of the one or more meta substituted oxy carboxylate gallate salts XVIII is between about 0.5 weight percent to about 30 weight percent.

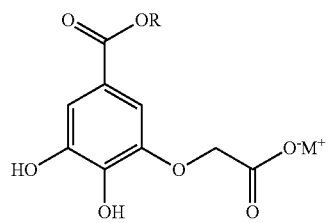

XVIII

R = H, alkyl, allyl, phenyl
M = Li, Na, K, Cs

Example 10

Using the synthetic reaction schemes described hereinabove, Applicant has prepared a variety of meta substituted oxy carboxamide gallate esters XIX. Applicant has found that lapping compositions comprising such meta substituted oxy carboxamide gallate esters XIX can be formulated using either one or more aqueous fluids, or one or more non-aqueous fluids, wherein the concentration of the one or more meta substituted oxy carboxamide gallate esters XIX is between about 0.5 weight percent to about 30 weight percent.

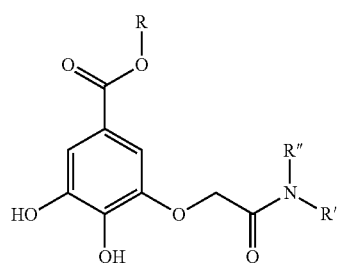

XIX

R = alkyl, allyl, phenyl
R' = H, alkyl, allyl, phenyl
R" = H, alkyl, allyl, phenyl

Example 11

Using the synthetic reaction schemes described hereinabove, Applicant has prepared a variety of meta substituted oxy ester gallamides XX. Applicant has found that lapping compositions comprising such meta substituted oxy ester gallamides XX can be formulated using either one or more aqueous fluids, or one or more non-aqueous fluids, wherein the concentration of the one or more meta substituted oxy ester gallamides XX is between about 0.5 weight percent to about 30 weight percent.

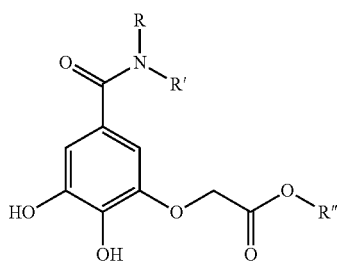

XX

R" = H, alkyl, allyl, phenyl
R' = H, alkyl, allyl, phenyl
R" = alkyl, allyl, phenyl

Example 12

Using the synthetic reaction schemes described hereinabove, Applicant has prepared a variety of meta substituted oxy carboxamide gallamides XXI. Applicant has found that lapping compositions comprising such meta substituted oxy carboxamide gallamides XXI can be formulated using either one or more aqueous fluids, or one or more non-aqueous fluids, wherein the concentration of the one or more meta substituted oxy carboxamide gallamides XXI is between about 0.5 weight percent to about 30 weight percent.

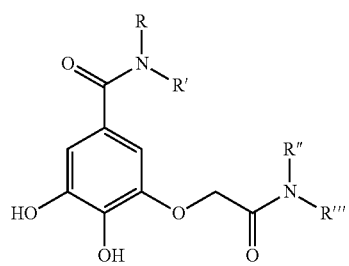

XXI

R = H, alkyl, allyl, phenyl
R' = H, alkyl, allyl, phenyl
R" = H, alkyl, allyl, phenyl
R'" = H, alkyl, allyl, phenyl

Example 13

Using the synthetic reaction schemes described hereinabove, Applicant has prepared a variety of meta substituted oxy thioester gallates XXII. Applicant has found that lapping compositions comprising such meta substituted oxy thioester gallates XXII can be formulated using either one or more aqueous fluids, or one or more non-aqueous fluids, wherein the concentration of the one or more meta substituted oxy thioester gallates XXII is between about 0.5 weight percent to about 30 weight percent.

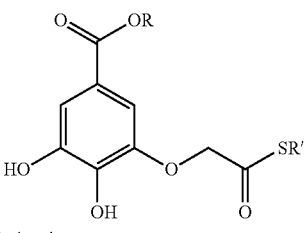

XXII

R = H, alkyl, allyl, phenyl
R″ = H, alkyl, allyl, phenyl

Example 14

Using the synthetic reaction schemes described hereinabove, Applicant has prepared a variety of meta substituted oxy ester gallate thioesters XXIII. Applicant has found that lapping compositions comprising such meta substituted oxy ester gallate thioesters XXIII can be formulated using either one or more aqueous fluids, or one or more non-aqueous fluids, wherein the concentration of the one or more meta substituted oxy ester gallate thioesters XXIII is between about 0.5 weight percent to about 30 weight percent.

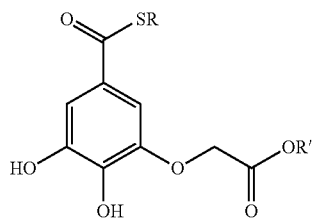

XXIII

R = H, alkyl, allyl, phenyl
R″ = H, alkyl, allyl, phenyl

Example 15

A lapping composition was formed by mixing 500 grams of water, 25 grams KOH, 25 grams ethylene glycol, and 50 grams of Compound II, wherein R1 was —O—$CH_3$ and wherein R2 was —$CH_2$—CO—O—$CH_3$.

Example 16

The lapping composition of Example 15 was diluted with an additional 500 grams of water.

Example 17

The lapping composition of Example 16 was further diluted with an additional 500 grams of water.

Example 18

A lapping composition was formed by mixing 667 grams of water, 41 grams KOH, 48 grams ethylene glycol, and 83 grams of Compound II, wherein R1 was —O—$CH_3$ and wherein R2 was —$CH_2$—CO—O—$CH_3$.

Example 19

The lapping composition of Example 18 was diluted with an additional 500 grams of water.

Example 20

The lapping composition of Example 18 was further diluted with an additional 500 grams of water.

While the preferred embodiments of the present invention have been illustrated in detail, it should be apparent that modifications and adaptations to those embodiments may occur to one skilled in the art without departing from the scope of the present invention.

I claim:
1. A lapping composition, comprising:
a compound having structure I or salts thereof:

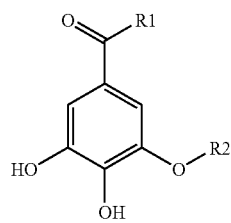

I wherein R1 is selected from the group consisting of —$O^-M^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3; and
wherein R2 is selected from the group consisting of —$O^-M^{x+}$ wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3.

2. The lapping composition of claim 1, further comprising:
a fluid;
wherein said compound is present in an amount between about 0.5 weight percent and about 30 weight percent.

3. The lapping composition of claim 2, wherein said fluid comprises water.

4. The lapping composition of claim 3, wherein said fluid further comprises ethylene glycol.

5. The lapping composition of claim 1, wherein:
R1 is —O—$CH_3$; and
R2 is —$CH_2$—CO—O—$CH_3$.

6. The lapping composition of claim 1, wherein:
R1 is —O—$C_{12}H_{25}$;
R2 is —$CH_2$—CO—O—$CH_3$.

7. The lapping composition of claim 1, wherein:
R1 is —O—$C_{12}H_{25}$;
R2 is —$CH_2$—CO—O—$C_{12}H_{25}$.

8. The lapping composition of claim 1, wherein:
R1 is —NH$(CH_2)_{11}CH_3$;
R2 is —$CH_2$—CO—O—$CH_3$.

9. A lapping composition formed by mixing:
a solvent;
a base; and
a phenolic compound having structure I:

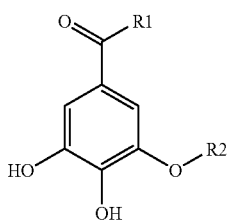

I wherein R1 is selected from the group consisting of —O⁻M^{x+} wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3; and wherein R2 is selected from the group consisting of —O⁻M^{x+} wherein x is selected from the group consisting of 1, 2, and 3, —O—R3 wherein R3 is selected from the group consisting of alkyl, allyl, and phenyl, —N(R3R4) wherein R4 is selected from the group consisting of —H, alkyl, allyl, and phenyl, and —S—R3.

10. The lapping composition of claim 9, wherein said solvent comprises water.

11. The lapping composition of claim 10, wherein said solvent further comprises ethylene glycol.

12. The lapping composition of claim 11, wherein said base comprises potassium hydroxide.

13. The lapping composition of claim 12, wherein said potassium hydroxide is present in at least a two fold molar excess with respect to said phenolic compound I.

14. The lapping composition of claim 12, wherein:
R1 is —O—CH₃; and
R2 is —CH₂—CO—O—CH₃.

15. The lapping composition of claim 13, wherein said lapping composition has a pH greater than or equal to 10.

16. The lapping composition of claim 14, wherein said water is present in at least 80 weight percent.

17. The lapping composition of claim 16, wherein said ethylene glycol is present in at least about 4 weight percent.

18. The lapping composition of claim 14, wherein said water is present in about 95 weight percent.

19. The lapping composition of claim 18, wherein said ethylene glycol is present in about 1.5 weight percent.

* * * * *